(12) United States Patent
Moebius et al.

(10) Patent No.: US 11,947,040 B2
(45) Date of Patent: *Apr. 2, 2024

(54) MONOSTATIC LIDAR TRANSCEIVER SYSTEM

(71) Applicant: The Charles Stark Draper Laboratory, Inc., Cambridge, MA (US)

(72) Inventors: Michael G. Moebius, Arlington, MA (US); Lucas D. Benney, Brighton, MA (US); Steven J. Spector, Lexington, MA (US); Steven J. Byrnes, Watertown, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,989

(22) Filed: Nov. 18, 2022

(65) Prior Publication Data
US 2023/0079911 A1 Mar. 16, 2023

Related U.S. Application Data

(63) Continuation of application No. 16/864,669, filed on May 1, 2020, now Pat. No. 11,550,037.

(51) Int. Cl.
*G01S 7/481* (2006.01)
*G01S 7/499* (2006.01)
*G01S 17/02* (2020.01)

(52) U.S. Cl.
CPC .......... *G01S 7/4816* (2013.01); *G01S 7/4813* (2013.01); *G01S 7/499* (2013.01); *G01S 17/02* (2013.01)

(58) Field of Classification Search
CPC ...... G01S 7/4816; G01S 17/02; G01S 7/4813; G01S 7/499; G01S 7/4817; G01S 17/42; G01S 7/4815
USPC ............................................ 356/139.09, 5.01
See application file for complete search history.

(56) References Cited

U.S. PATENT DOCUMENTS

| 5,847,815 | A | 12/1998 | Albouy et al. |
| 11,550,037 | B2 * | 1/2023 | Moebius ................. G01S 7/499 |
| 2017/0269215 | A1 | 9/2017 | Hall et al. |
| 2019/0162908 | A1 | 5/2019 | Moebius et al. |

OTHER PUBLICATIONS

Duck et al., Monostatic Lidar at f/200: a New Instrument at Millstone Hill / MIT Haystack Observatory, Advances in Laser Remote Sensing, pp. 73-76, 2001.

\* cited by examiner

*Primary Examiner* — Daniel L Murphy
(74) *Attorney, Agent, or Firm* — Brooks Kushman P.C.

(57) ABSTRACT

A LiDAR system includes a light source and an arrayed micro-optic configured to receive light from the light source so as to produce and project a two-dimensional array of light spots on a scene. The LiDAR system also includes receiver optics having an array of optical detection sites configured so as to be suitable for establishing a one-to-one correspondence between light spots in the two-dimensional array and optical detection sites in the receiver optics. The LiDAR system further includes a birefringent prism and a lens. The LiDAR system may also include a mask placed in the light path between the birefringent prism and the receiver optics. Alternatively, the LiDAR system may include a controller programmed to activate or deactivate each optical detection site.

26 Claims, 8 Drawing Sheets

MONOSTATIC LIDAR TRANSCEIVER SYSTEM

CROSS-REFERENCE TO RELATED APPLICATIONS

This application is a continuation of U.S. application Ser. No. 16/864,669 filed May 1, 2020, now issued as U.S. Pat. No. 11,550,037, the disclosure of which is hereby incorporated in its entirety by reference herein.

TECHNICAL FIELD

The present invention relates to Light Detection and Ranging, and more particularly to a birefringent prism architecture for monostatic Light Detection and Ranging.

BACKGROUND

Monostatic Light Detection and Ranging (LiDAR) systems have the advantage, over bistatic systems, of not being affected by parallax. However, this requires the transmitter and receiver to be at the same location or located along the same optical path. Physically, the transmitter and receiver cannot be placed in the same location. Other solutions (for photonic integrated circuit-based solid-state LiDAR or optical communications systems), such as using an integrated 3-dB splitter in a waveguide to provide separate paths for the outgoing signal and return signal can lead to crosstalk and additional return signal loss.

SUMMARY

The deficiencies of the prior art are overcome by separating the optical transmit and receive paths. A birefringent prism is placed above the transmitter. The receiver is placed such that a birefringent prism redirects the signal reflected from the scene to the receiver. The configuration of the transmitter, birefringent prism, and receiver can be adjusted to maximize the return signal detected, minimize the impact of background light, and simplify assembly and alignment of the device. Concepts to address each of these points are included in this disclosure.

In accordance with one embodiment of the invention, a LiDAR system includes a light source; an arrayed micro-optic having an array of optical emission sites configured to receive light from the light source so as to produce and project a two-dimensional array of light spots on a scene; receiver optics having an array of optical detection sites configured so as to be suitable for establishing a one-to-one correspondence between light spots in the two-dimensional array and optical detection sites in the receiver optics; a lens; a birefringent prism; a quarter wave plate; and a mask having an array of apertures placed in the light path between the lens and the receiver optics, wherein each of the apertures is placed in front of a respective one of the optical detection sites. The lens, the birefringent prism, and the quarter wave plate are arranged so that light travels from the arrayed micro-optic to the lens, from the lens to the birefringent prism, from the birefringent prism to the quarter wave plate, and from the quarter wave plate to the scene and wherein light reflected from the scene travels from the scene to the quarter wave plate, from the quarter wave plate to the birefringent prism, from the birefringent prism to the lens, and then from the lens to the receiver optics.

In addition or alternatively, the birefringent prism includes a wedge. Also alternatively or in addition, the arrayed micro-optic includes a micro-opto-electro-mechanical (MOEMS) chip having a waveguide. In a related embodiment, the waveguide includes a transparent substrate. In a further related embodiment, the MOEMS chip includes a plurality of optical gratings. In a related embodiment, each of the plurality of optical gratings corresponds to one optical emission site of the array of optical emission sites.

Alternatively or in addition, the mask includes a layer having a plurality of openings, each opening being in the light path leading to a respective one of the optical detection sites. In a related embodiment, the mask is coupled to the MOEMS chip. In a further related embodiment, the distance between the MOEMS chip and the receiver optics is in the range of 5 to 30 micrometers. In a related embodiment, the layer is made from a material selected from the group consisting of aluminum, copper, gold, platinum, chromium, titanium, silicon, carbon, graphite, or combinations thereof.

Alternatively or in addition, a shape of at least one of the apertures corresponds to a calculated or measured aberrated shape of a light spot received in a focal plane of the respective optical detection site. In a related embodiment, a shape of at least one of the apertures is different from a shape of another one of the apertures. In a further related embodiment, a shape of at least one of the apertures is selected to mitigate variations in manufacturing of the respective optical detection site or a thermal shift of the respective optical detection site.

Alternatively or in addition, the LiDAR system includes a controller, wherein the controller is configured to selectively activate or deactivate each optical detection site of the array of optical detection sites. In a related embodiment, a size of each optical detection site is smaller than a size of each light spot projected onto the receiver optics. In a further related embodiment, the controller is configured to selectively activate or deactivate each optical detection site to correspond to a calculated or measured aberrated shape of a light spot received in a focal plane of the array of optical detection sites.

Alternatively or in addition, the controller is further configured to selectively activate or deactivate each optical emission site of the array of optical emission sites. In a related embodiment, an activation state of at least one emission site of the array of optical emission sites determines an activation state of an associated at least one optical detection site of the array of optical detection sites.

In a further related embodiment, the optical detection sites are single-photon avalanche diode (SPAD) detectors. Alternatively or in addition, the optical detection sites are silicon photomultiplier (SiPM) detectors.

In a related embodiment, the LiDAR system includes a plurality of grating couplers to couple incident light from each grating of the plurality of optical gratings into the waveguide. In a further related embodiment, the grating couplers are made from silicon nitride, the optical gratings are made from silicon or silicon nitride, and the waveguide is made from silicon or silicon nitride.

Alternatively or in addition, the birefringent prism shifts a beam of light traveling through the birefringent prism by half a degree or less. In a related embodiment, the plurality of optical gratings and the receiver optics are arranged in the same plane. In a further related embodiment, the MOEMS chip and the receiver optics form a monolithic structure. In a related embodiment, the receiver optics comprise a detector chip and the MOEMS chip is bonded to the detector chip.

BRIEF DESCRIPTION OF THE DRAWINGS

The foregoing features of embodiments will be more readily understood by reference to the following detailed description, taken with reference to the accompanying drawings, in which.

DETAILED DESCRIPTION

Figure 1:
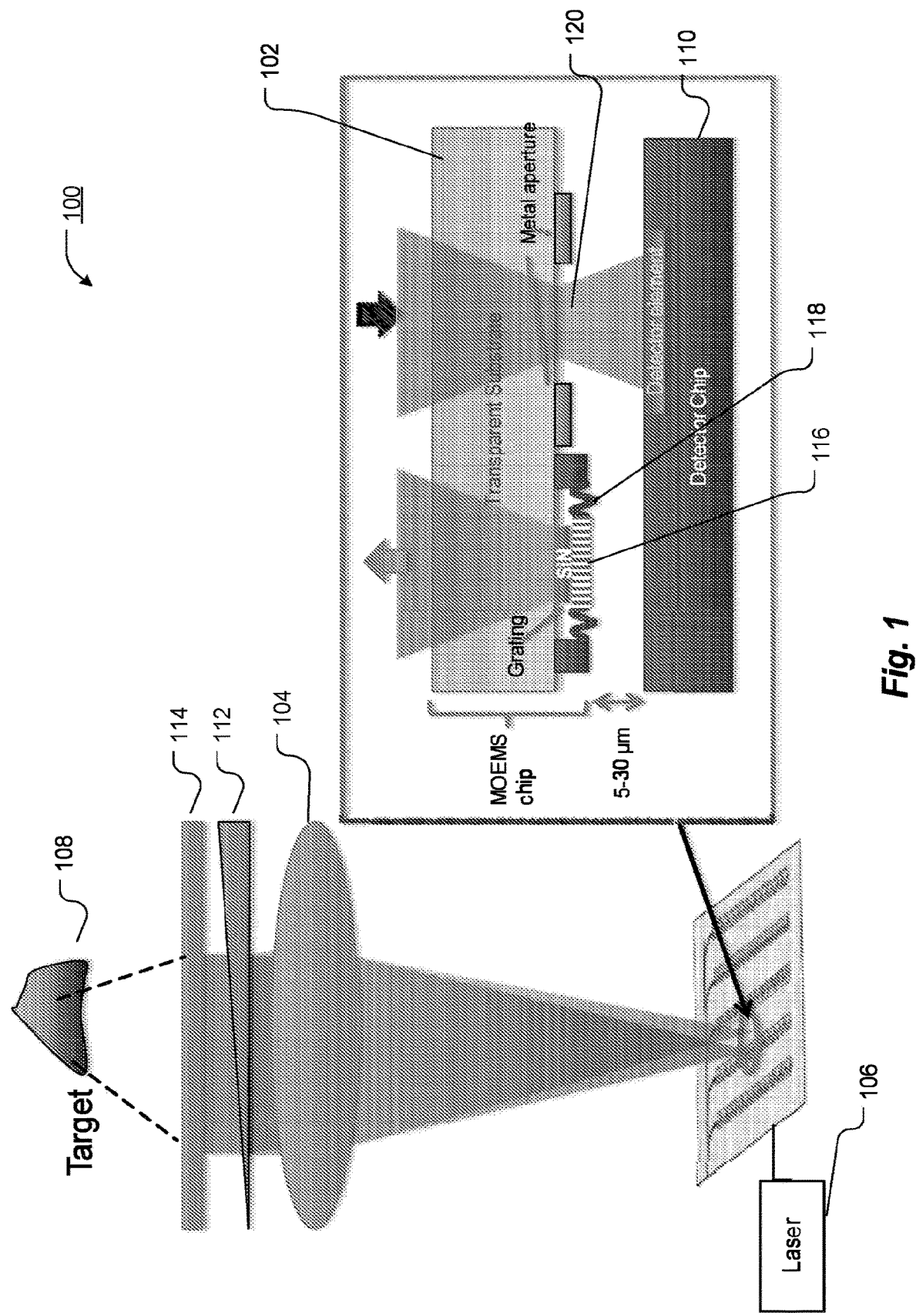
FIG. 1 shows a LiDAR system in accordance with an embodiment of the present invention.

FIG. 1 shows a LiDAR system 100 in accordance with an embodiment of the present invention. The LiDAR system 100 may include a photonic integrated circuit (PIC) beam steering chip 102 placed at the focal plane of an objective lens 104 (switched focal plane array solid-state LiDAR). The PIC may be manufactured as an arrayed micro-optic, including an array of optical emission sites. Light emitted from a light source 106, such as a laser source, is routed on the PIC 102 using waveguides, and micro-opto-electro-mechanical (MOEMS) structures determine from which optical emission sites on the PIC 102 light is emitted toward a scene 108 to be scanned. While a combination of a single laser source and a PIC is recited throughout this disclosure, it is expressly contemplated that any other planar emitter array, e.g. an array of vertical-cavity surface-emitting lasers (VCSELs), could be used and incorporated into the embodiments disclosed herein instead of or in addition to a single laser source and a PIC.

The laser light is projected onto the scene 108 as a two-dimensional array of light spots. The PIC 102 may be configured to project groups of light spots simultaneously. In alternative embodiments, light spots can be projected sequentially. Transmit and receive paths are separated using a birefringent prism 112 and a quarter waveplate 114. Receiver optics, such as a detector array 110 having a plurality of optical detection sites, receives the return signal from the scene 108. As described in further detail below, the optical emission sites and optical detection sites correspond to one another. There may be a one-to-one correspondence or a one-to-n correspondence (e.g., more than one optical detection site corresponds to one optical emission site). Therefore, there is also a one-to-one or one-to-n correspondence between the two-dimensional array of light spots in the scene 108 and the array of optical detection sites in the receiver optics.

Light is emitted from the optical emission sites on the PIC 102. The optical emission sites may include a plurality of MOEMS structures, for example arranged on a MOEMS chip, and one or more waveguides, all located on PIC 102. The lens 104 is placed between the PIC 102 and the birefringent prism 112. The lens 104 focuses outgoing light into the scene 108 through the birefringent prism 112 and the quarter waveplate 114. Return signal is directed again through the quarter wave plate 114 and the birefringent prism 112 to be collected by the lens 104. The lens 104 focuses incoming light onto the detector array 110. The detector array 110 may include a detector chip. The PIC and detector chip may be bonded to each other. Exemplarily, the MOEMS chip and detector chip are manufactured from wafers in a CMOS foundry. The manufacturing process is arranged such that there is no silicon left in the MOEMS wafer after manufacture, making the MOEMS wafer transparent. The transparent MOEMS chip wafer and the detector chip wafer are then bonded together so that the distance between the MOEMS wafer and the detector chip wafer is in the range of 5 to 30 micrometers. Alternatively, MOEMS chip and detector chip may be a monolithic structure. In this case, both parts, MOEMS chip and detector chip, are manufactured in a CMOS foundry at the same time from a single wafer. In the monolithic configuration, the distance between the MOEMS part and the detector part is also in the range of 5 to 30 micrometers.

To manufacture a transparent MOEMS wafer that is bonded to a detector chip wafer, MOEMS devices are fabricated upside down on a silicon substrate. The substrate with MOEMS devices is then flipped and bonded to a quartz wafer such that the MOEMS devices will be in the correct orientation, with silicon substrate on top and a quartz wafer bonded to the bottom. A silicon detector wafer is now bonded to the bottom of this structure so that the silicon detector wafer is adjacent to the quartz wafer. The silicon substrate on top of the bonded structure is then removed by a suitable etching process. To avoid the need to manufacture the MOEMS devices upside down, MOEMS devices may be fabricated on a silicon substrate in the usual manner. The substrate with MOEMS devices is then flipped and bonded to a silicon wafer such that the silicon wafer is on the bottom, the MOEMS devices on top of the silicon wafer, and the silicon substrate on top of the MOEMS devices. The silicon substrate on top is removed by a suitable etching process. After etching, the structure is now flipped again and bonded on top of a quartz wafer such that the quartz wafer is on the bottom, the MOEMS devices on top of the quartz wafer, and the silicon wafer on top of the MOEMS devices. A second etching removes the bulk of the silicon wafer on top and releases the MOEMS devices. A silicon detector wafer may be bonded to the MOEMS chip as described above.

The PIC 102 includes MOEMS structures on a MOEMS chip and one or more waveguides. As described above, the waveguide substrate is transparent to allow outgoing and incoming light to pass through. The waveguide substrate may be made from silicon or silicon nitride. The MOEMS chip further includes a plurality of optical gratings 116. Each of the plurality of optical gratings may correspond to one optical emission site of the array of optical emission sites on the PIC 102. Each optical grating 116 may be controlled by a corresponding MEMS element 118 and may be made from silicon or silicon nitride. The MOEMS chip may also include a plurality of grating couplers to couple incident light from each grating into the waveguide. The grating couplers may, for example, be manufactured from silicon nitride.

The PIC 102 further includes a mask that has an array of openings 120. Each opening 120 is placed in the light path leading to an optical detection side on the detector array 110. Accordingly, the openings 120 in the mask are apertures for the detector array 110. The mask may be coupled to the MOEMS chip and may be made from aluminum, copper, gold, platinum, chromium, titanium, silicon, carbon, graphite, or any other material commonly found in a CMOS foundry. The apertures 120 and the optical gratings 116 may be located in the same plane.

One or more detection sites are assigned and aligned to each emission site. The detection sites may, for example, be an array of single-photon avalanche diodes (SPADs) or a silicon photomultiplier (SiPM), or it may be any other suitable multi-element detector or two-dimensional array of single-element detectors. The outgoing light from the PIC 102 passes through the objective lens 104, which will introduce some aberrations and define the shape of the outgoing beam in the scene 108. This beam shape and transmission of signal photons through the objective 104 on the return defines the shape of the signal beamspot on the detector array 110.

Illustratively, the birefringent prism 112 shifts a beam of light traveling through the prism by half a degree or less. This allows the emitter sites and detector sites to be located close to one another. The birefringent prism may, for example, be a birefringent wedge. The birefringent wedge may be manufactured from a birefringent material that is polished and shaped to achieve the desired beam shift. The birefringent wedge may be located in the Fourier plane, i.e., on the opposite side of the lens 104 from the PIC 102. While the embodiments shown and described throughout this disclosure show a birefringent wedge in the Fourier plane, it is expressly contemplated that the birefringent prism may also be a birefringent beam displacer. Such beam displacer may be located near the PIC 102 in the image plane, i.e., on the same side of the lens 104 as the PIC 102.

The quarter waveplate 114 converts linearly polarized light to circular polarization. Linearly polarized light is preferentially reflected in the same polarization, but circular polarized light is reflected from most surfaces with a random polarization, and indeed reflected from certain retroreflectors with opposite circular polarization. Therefore the quarter waveplate 114 is advantageous to ensure that sufficient signal reaches the detector 110.

A series of embodiments can maximize the return signal detected, minimize the impact of background light, and simplify assembly and alignment.

Figure 2:
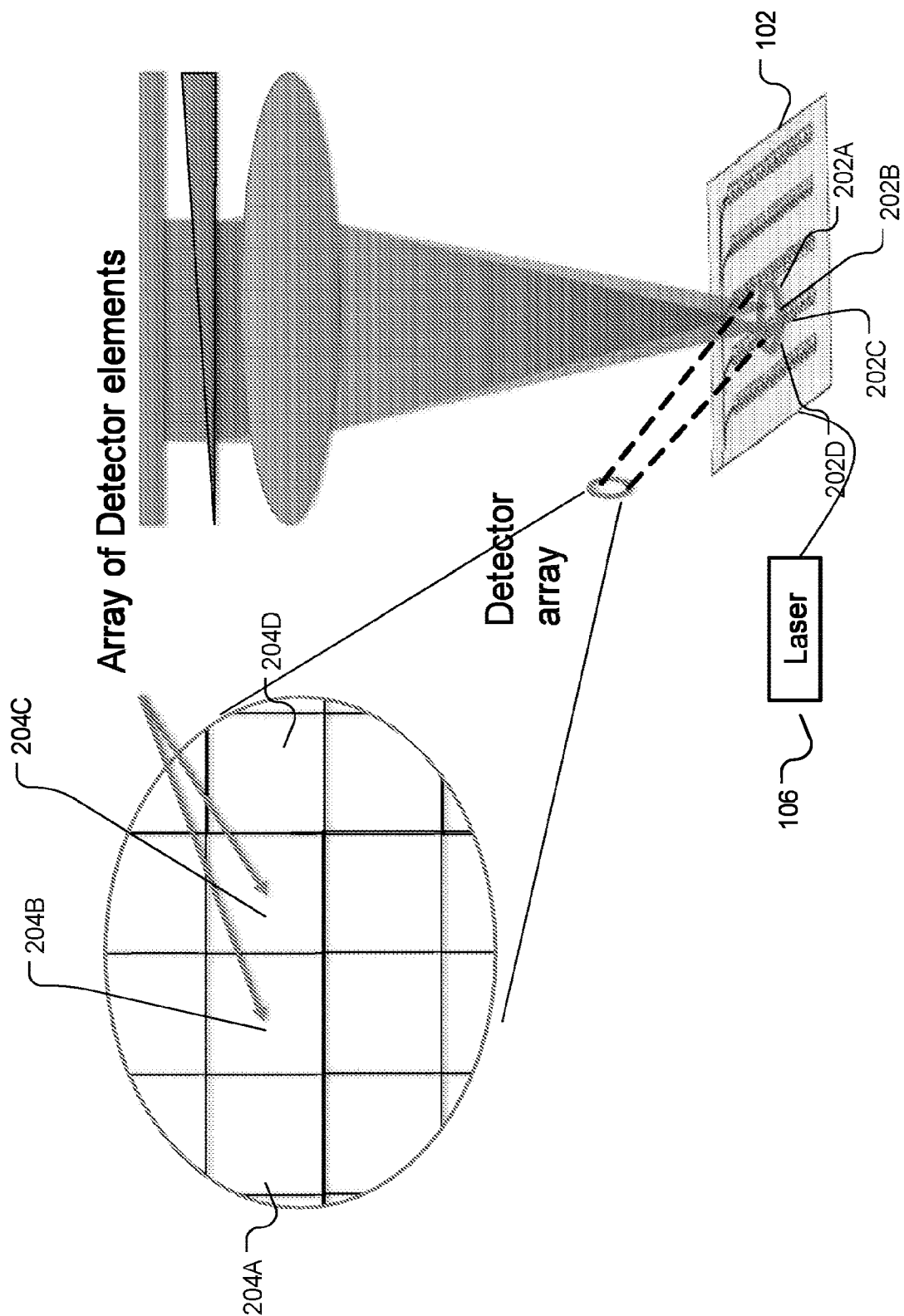
FIG. 2 shows a detector array in accordance with an embodiment of the present invention.

FIG. 2 shows a detector array in accordance with an embodiment of the present invention. Every light spot projected onto the scene by an optical emission site 202A-202D has at least one corresponding optical detection site 204A-204D. Exemplarily, the light spot projected by emission site 202A corresponds to detection site 204A, the light spot projected by emission site 202B corresponds to detection site 204B, the light spot projected by emission site 202C corresponds to detection site 204C, and the light spot projected by emission site 202D corresponds to detection site 204D. More specifically, emission and detection sites that correspond to one another may be located adjacent to each other in one plane at a distance corresponding to the beam displacement caused by the birefringent prism 112, and in an orthogonal plane are separated by the 5-30 micrometer distance between MOEMS chip and detector chip as shown in FIG. 1. In general, the correspondence between light spots projected onto the scene by emission sites and the detection sites is determined by the layout of emission sites on the PIC and the layout of optical detection sites on the receiver optics. It is also expressly contemplated that more than one optical detection site may correspond to one emission site or the light spot projected onto the scene by one emission site.

Figure 3:
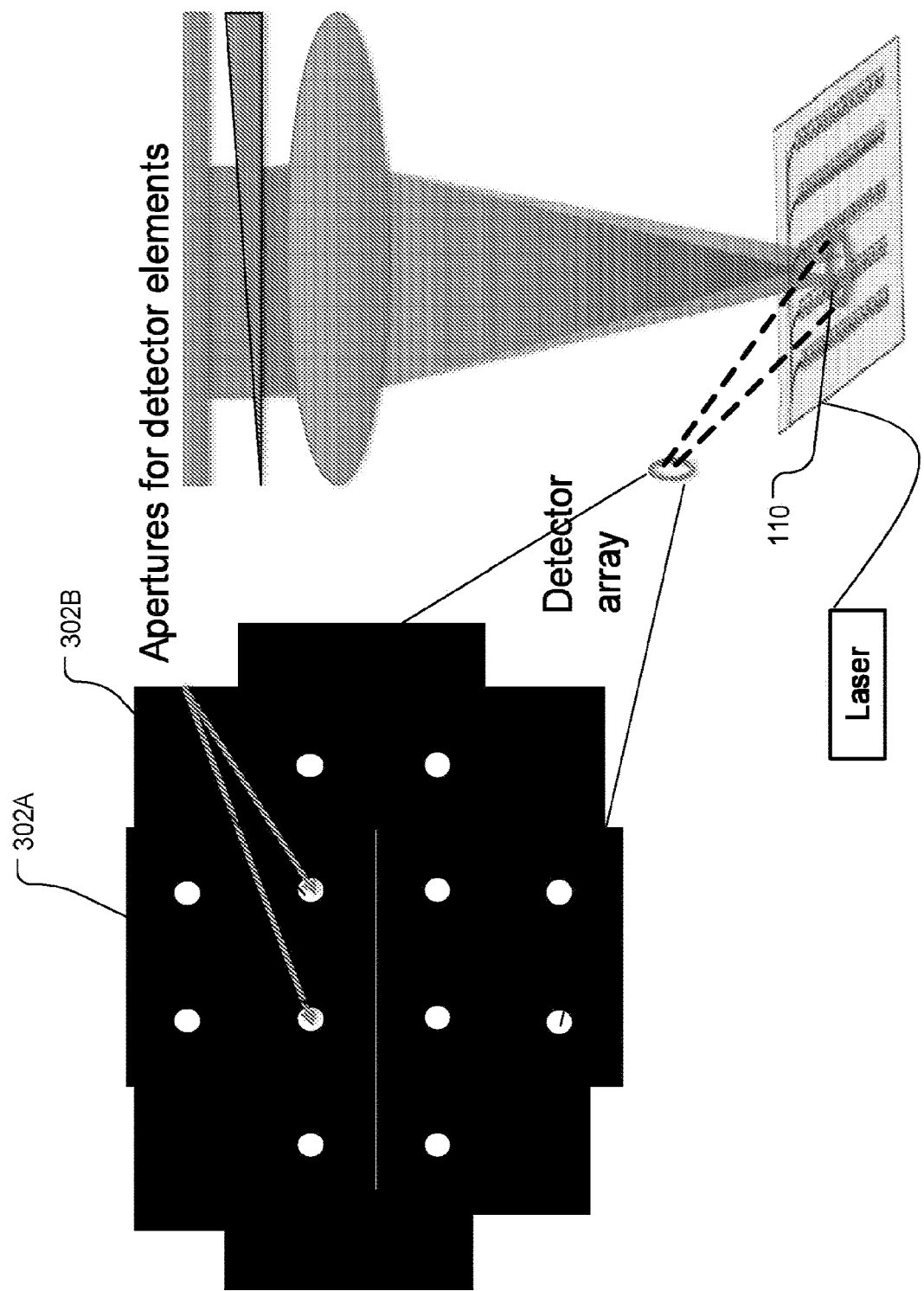
FIG. 3 shows a mask having an array of apertures in accordance with an embodiment of the present invention.

FIG. 3 shows a mask having an array of apertures in accordance with an embodiment of the present invention. As shown in more detail above in reference to FIG. 1, the mask may be coupled to the MOEMS chip. An aperture is placed on the MOEMS chip in front of each detection site in the receiver optics 110 so that it is in the light path between the birefringent prism 112 and the receiver optics 110. However, it is expressly contemplated that the mask may not be directly coupled to the MOEMS chip but may be placed in the light path between PIC and receiver optics. By way of example, apertures 302A and 302B are shown. These apertures mask the corresponding optical detection sites located behind them.

Matching the shape and size of the aperture to the expected return signal beamspot enables maximizing the amount of signal that makes it to the detection site, while minimizing the area through which background photons can reach the detection site. For example, the shape and size of the light spot projected onto an optical detection site as a reflection could determine the shape and size of the corresponding aperture. In other words, the shape and size of the apertures may be selected according to the spread function of the expected return signal at the corresponding optical detection site, for example to correspond to known aberrations of the lens 104. Exemplarily, the shapes of the apertures may vary across the array of apertures as the aberrations are not the same throughout the detector array. Lens aberrations may be modeled or measured to determine the size and shape of the apertures. In addition or alternatively, the size and shape of the apertures could be selected to mitigate variations in manufacturing of the respective optical detection site, or it could be selected to mitigate an expected or measured thermal shift of the respective optical detection site. The apertures could all be of the same shape and size, or the apertures could have different shapes and sizes.

Alternatively, the mask could be formed by limiting or shaping the active area of the detection sites in the receiver optic during fabrication. For example, detection sites at the edges of the field of view could be made more oblong than detection sites towards the center of the field of view to account for varying refraction of the expected return signal by the lens throughout the field of view.

Figure 4:
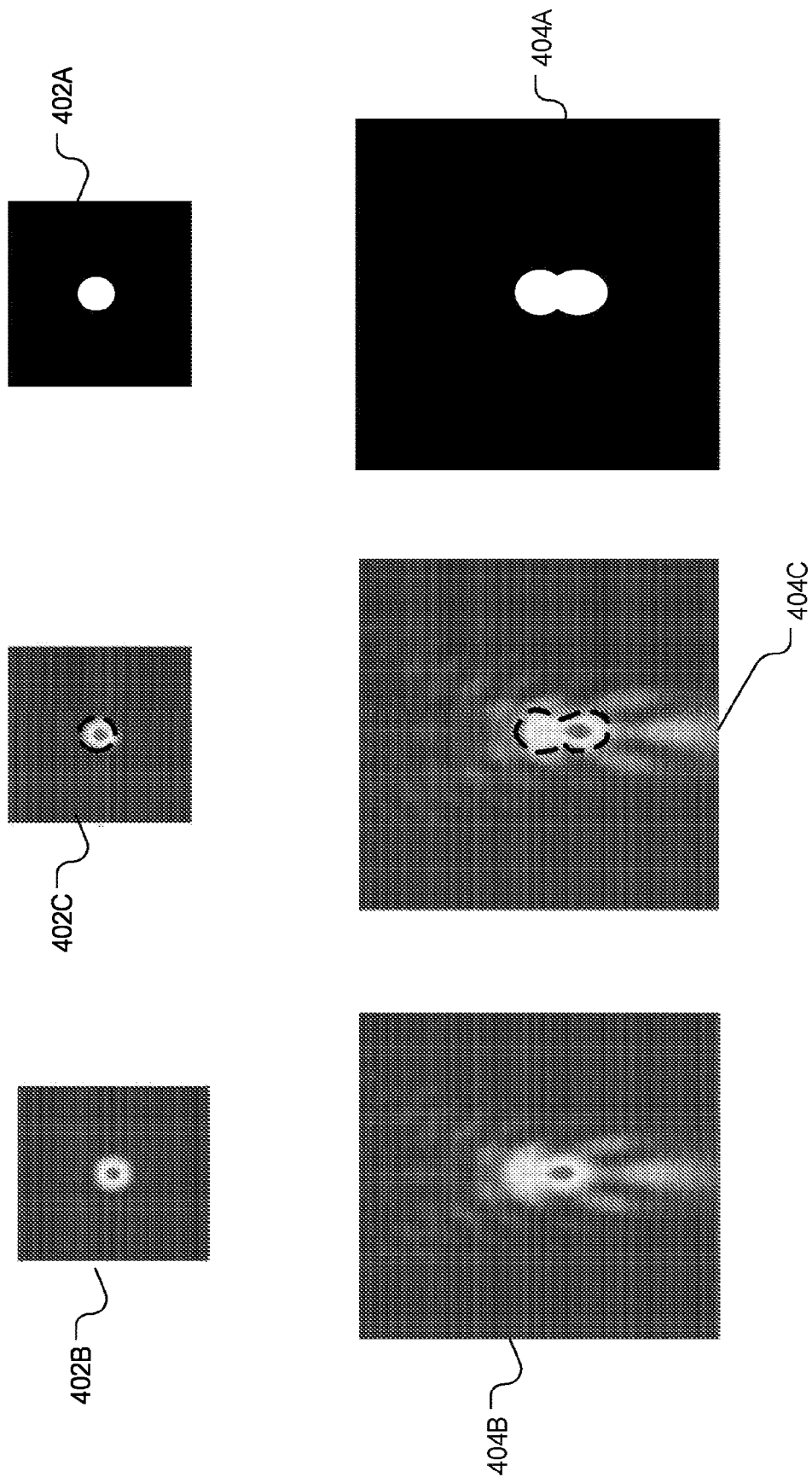
FIG. 4 shows matching size and shape of the apertures to the expected return signal in accordance with an embodiment of the present invention.

FIG. 4 depicts how the shape and size of the apertures is matched to the expected return signal beamspot. Aperture 402A is selected based on the expected circular return signal beamspot 402B. Placing the aperture 402A in the optical path of the return signal results in beamspot 402C. As can be seen, the area through which background photons can reach the optical detection site is minimized. Similarly, aperture 404A is selected based on the expected elongated return signal beamspot 404B. Placing the aperture 404A in the optical path of the return signal results in beamspot 404C. Background photons are mostly masked out by the aperture 404A. However, the resulting beamspot 404C is still large enough that the amount of signal that reaches the detector is maximized.

Attempting to perfectly match the shape and size of the aperture and return signal beamspot leads to tight tolerances on relative placement of the transmitter, receiver, birefringent prism, and lens. Shifts along the optic axis of the transmitter and receiver relative to the objective will primarily lead to a change in size of the return signal beamspot. Shifts perpendicular to the optic axis will lead to changes in position of the beamspot on the receiver. A perfectly sized aperture will therefore reduce the detected signal in the case of misalignments. Using a larger aperture provides greater tolerance on alignment, at the cost of higher background.

Figure 5:
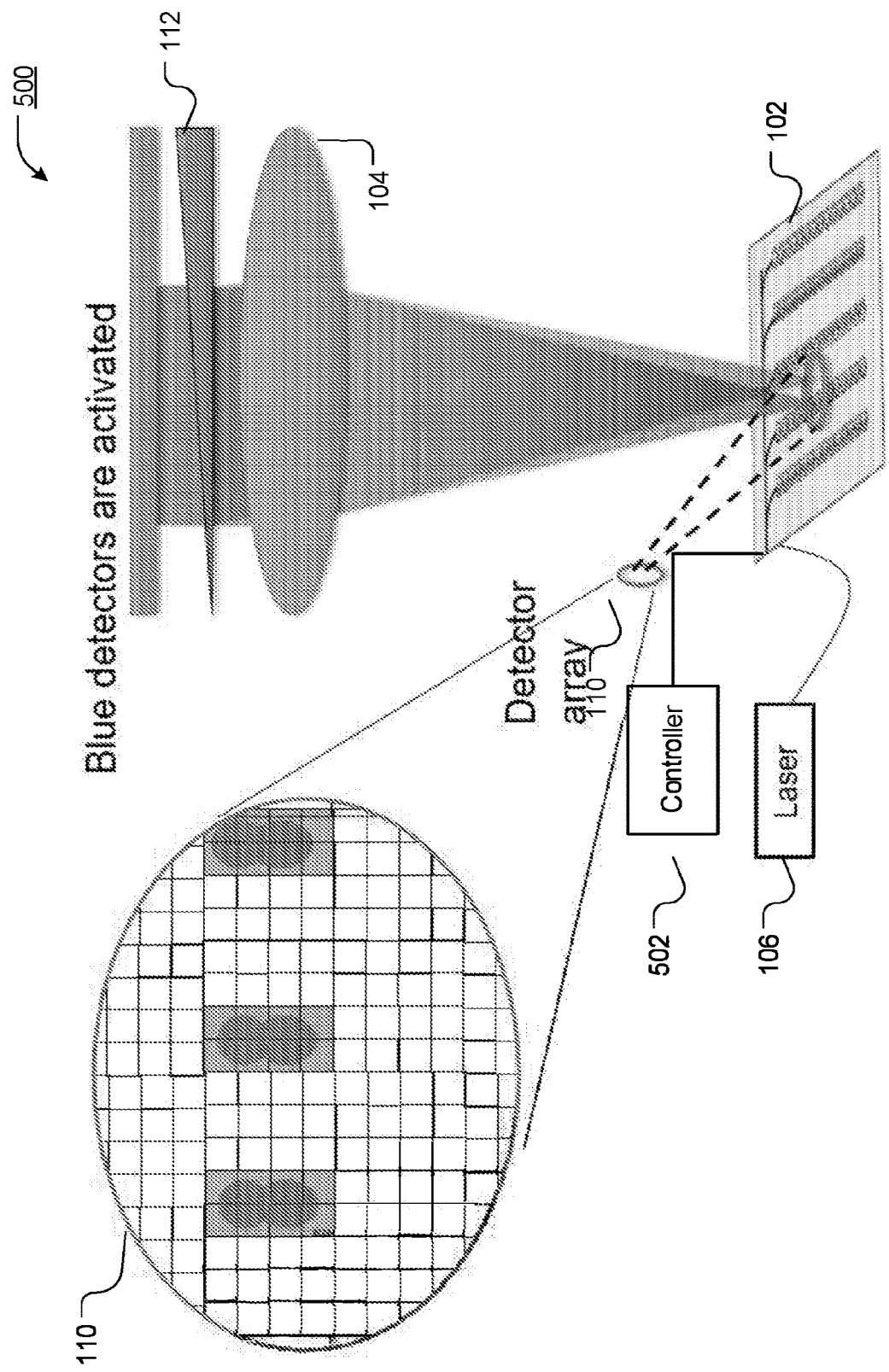
FIG. 5 shows a LiDAR system in accordance with an embodiment of the present invention.

FIG. 5 depicts a LiDAR system in accordance with an alternative embodiment of the present invention. Similar to the embodiment described above in reference to FIG. 1, in LiDAR system 500 light is emitted from a laser source 106 and routed to a PIC 102. A lens 104 is placed between the PIC 102 and the birefringent prism 112. The lens 104 focuses outgoing light into the scene (not shown). The laser light is projected onto the scene as a two-dimensional array of light spots. Return signal is directed through the birefringent prism 112 and collected by the lens 104. The lens 104 focuses incoming light onto the detector array 110, as the PIC 102 and the detector array 110 are in the same plane. The detector array 110 has a direct mapping of detector elements to emission locations on the transmit PIC 102. One or more detection sites correspond to the light spot projected by each emission site, as described above with reference to FIG. 2.

Instead of or in addition to using a physical barrier such as a mask, multi-element detectors such as detector array 110 provide an opportunity to enable dynamic adjustments to the (simulated) aperture to limit background signal. If each individual optical detection site in the receiver optics/detector array 110 is much smaller than the beamspot projected from a location in the scene onto the receiver optics, then a plurality of optical detection sites can be assigned to each return light spot in the LiDAR system. Based on the shape of the beamspot, specific optical detection sites for this return light spot are selected and activated. The detector array 110 may be a silicon photomultiplier (SiPM). The detector array 110 may also be an array of single-photon avalanche diodes (SPADs), or it may be any other multi-element detector or two-dimensional array of single-element detectors known to a person having skill in the art.

A controller 502 is coupled to the detector array 110 and programmed to selectively activate and deactivate each optical detection site in the detector array 110. The selection which optical detection sites to activate and which to deactivate can be made after aligning the transmitter, receiver, birefringent prism, and lens, and it can be based on the expected beamspot of the return signal projected onto the receiver optics. Lens aberrations and variations in manufacturing of the optical detection sites can be taken into account. Further, the controller can be programmed to account for thermal shifts in the receiver optics during operation of the LiDAR system by adjusting the assignment of optical detection sites to return light spots projected onto the receiver optics.

Alternatively or in addition, the controller 502 may also be coupled to the PIC 102 and programmed to selectively activate and deactivate each optical emission site on the PIC 102. As the laser light from the laser 106 is routed through the PIC 102, activation or deactivation of optical emission sites allows control over which emission sites emit light. As the LiDAR system now knows which optical emission sites on the PIC 102 emit light, optical detection sites in the detector array 110 can be activated and deactivated accordingly by the controller 502. The set of optical detection sites which are turned on for any given emission site can be hard-coded based on the design, or it can be set during an initial calibration routine at the time of manufacture, or set during a periodic calibration during servicing, or set in real time, for example by periodically or continually measuring extra detection sites and, for example, deciding algorithmically whether to use or discard their data based on analysis of that data. The set of detection sites which are turned on for any given emission site can be varied based on environmental factors, such as the temperature of the unit, the amount of stray light in the environment, or the expected range and brightness for that particular pixel, for example.

Figure 6:
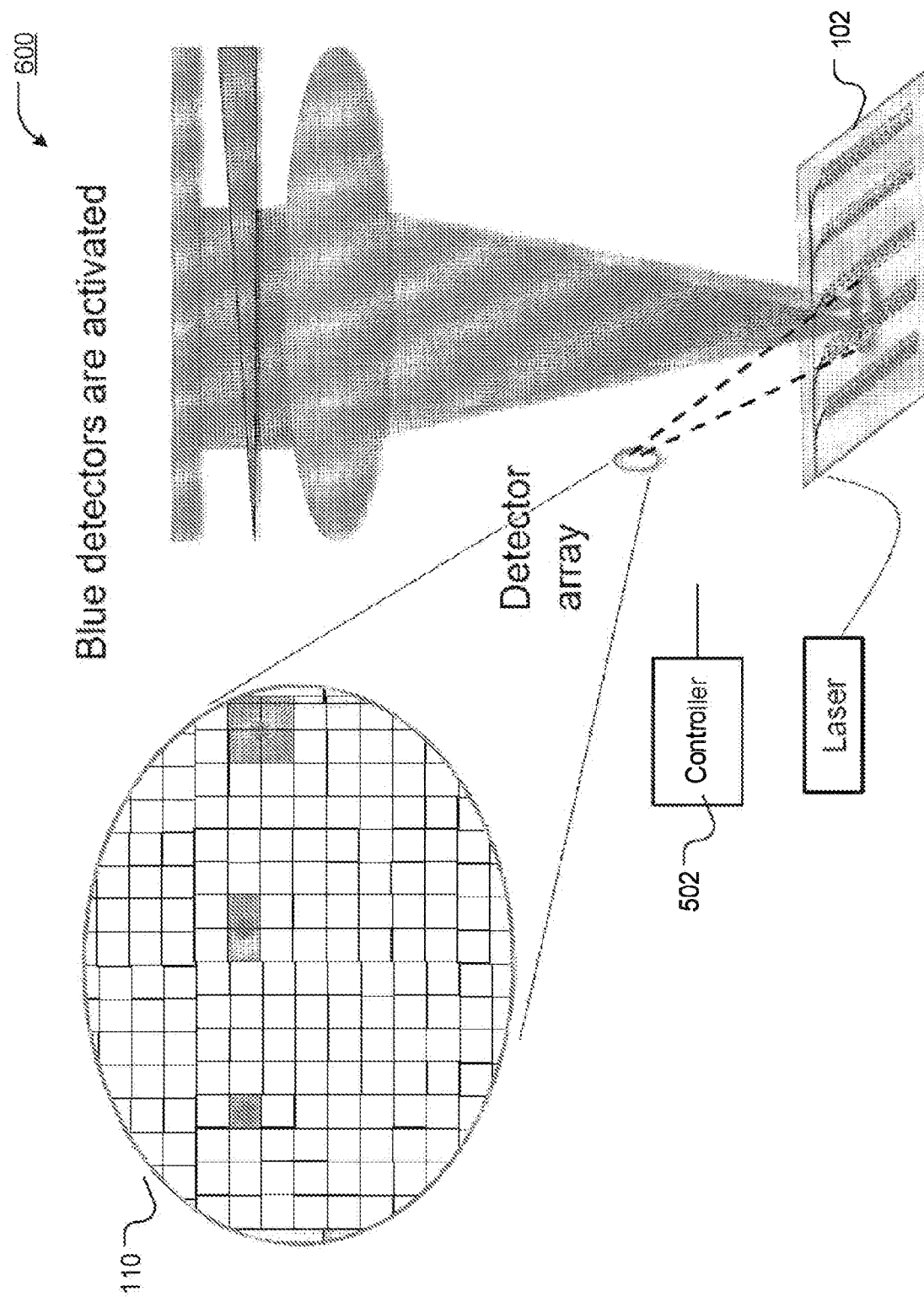
FIG. 6 depicts a LiDAR system in accordance with an embodiment of the present invention.

FIG. 6 shows LiDAR system 600. Similar to LiDAR system 500 described above in reference to FIG. 5, the detector array 110 is coupled to a controller 502 that can selectively activate and deactivate each optical detection site in detector array 110. If the size of an optical detection site in the detector array 110 is close to, or preferably somewhat larger than, the beamspot projected onto the receiver optics, then a single optical detection site, or a plurality of optical detection sites such as a 2×2 array, can be mapped to each pixel. The controller 502 is programmed to only turn on optical detection sites that correspond to the location of an active emission site on the PIC 102. This minimizes the background noise, while allowing for very generous lateral alignment tolerance.

Figure 7:
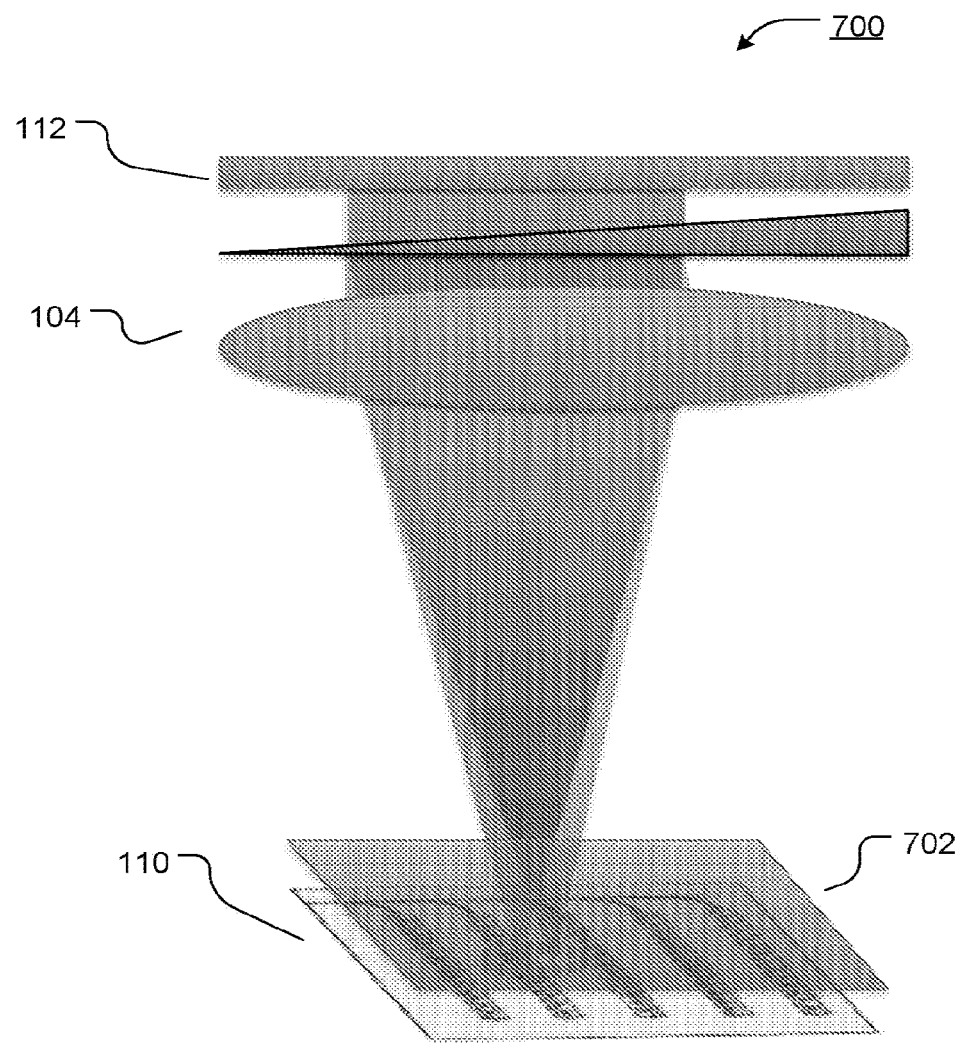
FIG. 7 shows a LiDAR system in accordance with an embodiment of the present invention.

FIG. 7 depicts LiDAR system 700 including a wavelength filter 702 for ambient light reduction. Exemplarily, the wavelength filter 702 may be a dielectric stack filter. The filter bandwidth is generally selected to be centered on the output wavelength of the laser. Preferably, the filter 702 is placed between the PIC and the detector array 110 to minimize loss by requiring light to pass through the filter only once. To achieve this placement, the filter 702 may be directly fabricated on top of the detector array 110. The filter 702 may also be placed between the birefringent prism 112 and the PIC. If the objective lens 104 design is non-telecentric, then the light approaches the detector at different angles relative to normal, depending on the location in the focal plane. Varying the filter design, e.g. by varying the film thickness of a dielectric stack filter, across the focal plane can ensure the best performance across the full field of view. Alternatively, the filter can be placed within the lens train in a location where the variation in angles of different rays is minimized. One option would be to deposit the filter dielectric stack directly on one of the lens elements. This avoids requiring an additional optic and will ensure good filter performance if there is a lens element that all rays are incident close to normal on.

Figure 8:
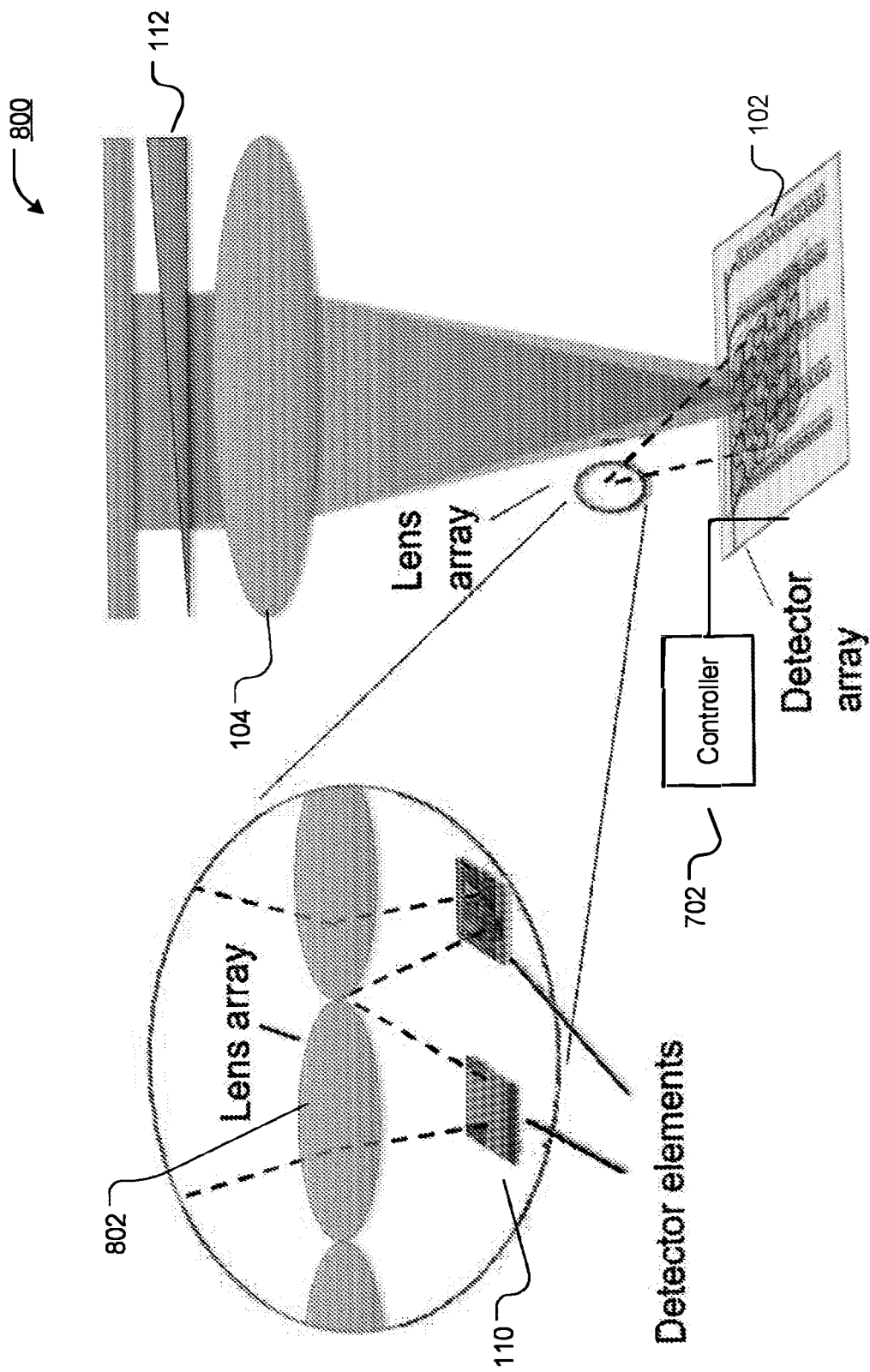
FIG. 8 depicts a LiDAR system in accordance with an embodiment of the present invention.

FIG. 8 depicts a LiDAR system in accordance with an embodiment of the present invention. LiDAR system 800 includes an array of lenses or lenslets 802. The array of lenses or lenslets 802 is placed in the light path between the birefringent prism 112 and the receiver optics 110. Inclusion of the lens array 802 above the detector array 110 minimizes dead regions between optical detection sites in detector array 110 when using selectively activated or deactivated optical detection sites as described above in reference to FIGS. 5 and 6. The lens array 802 also provides an additional benefit of limiting the angular acceptance of the optical detection sites to reduce the detection of unwanted scattered light. The inclusion of a lens array 802 above the PIC 102 and/or detector array 110 can also correct for small amounts of field curvature in design of the objective lens 104. This aberration compensation enables smaller aperture sizes over the detector array and thus enables the collection of less background light. For example, the lenses or lenslets in the array 802 may be microlenses with high refractive indices.

A diffractive optical element can be used in place of a lens array for any of the improvements mentioned above. A diffractive optical element offers the additional capability of compensation for other aberrations in the lens, in addition to field curvature. This is analogous to what is described in U.S. patent application Ser. No. 16/202,254 entitled "Coupling Lens Aberration Correction through Grating Design in a Switched Focal Plane Array" by some of the current inventors, which is incorporated herein by reference in its entirety. However, in the embodiments disclosed herein, the aberration correction only occurs as the light is being received, instead of as the light is being both sent and received. This limits how much correction is possible.

In accordance with certain embodiments of the present invention, the controller programmed to selectively activate and deactivate optical detection sites, as described herein, may be implemented as a computer program product for use with a computer system. Such implementations may include a series of computer instructions fixed either on a tangible medium, which is preferably non-transient and substantially immutable, such as a computer readable medium (e.g., a diskette, CD-ROM, ROM, flash drive, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware (e.g., an ASIC or FPGA). Still other embodiments of the invention are implemented as entirely hardware, or entirely software (e.g., a computer program product).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for operation of a light detection and ranging (LiDAR) system, comprising:
producing and projecting a two-dimensional array of light spots on a scene, by an arrayed micro-optic having an array of optical emission sites, using light emitted from a light source, such that the light travels a light path from the arrayed micro-optic to a lens, from the lens to a birefringent prism, from the birefringent prism to a quarter wave plate, and from the quarter wave plate to the scene, wherein the light as reflected from the scene travels from the scene to the quarter wave plate, from the quarter wave plate to the birefringent prism, from the birefringent prism to the lens, and from the lens to receiver optics having an array of optical detection sites; and receiving, by the receiver optics, the light as reflected from the scene, each of the light spots in the two-dimensional array having a one-to-one correspondence with an optical detection site in the receiver optics, a mask having an array of apertures being located in the light path between the lens and the receiver optics, each of the apertures being located in front of a respective one of the optical detection sites.

2. The method of claim 1, wherein the birefringent prism comprises a birefringent wedge.

3. The method of claim 1, wherein the arrayed micro-optic comprises a micro-opto-electro-mechanical system (MOEMS) chip having a waveguide.

4. The method of claim 3, wherein the mask is coupled to the MOEMS chip.

5. The method of claim 3, wherein a distance between the MOEMS chip and the receiver optics is in the range of 5 to 30 micrometers.

6. The method of claim 3, wherein the waveguide comprises a transparent substrate.

7. The method of claim 3, wherein the MOEMS chip and the receiver optics form a monolithic structure.

8. The method of claim 7, wherein the receiver optics include a detector chip and wherein the MOEMS chip is bonded to the detector chip.

9. The method of claim 3, wherein the MOEMS chip comprises a plurality of optical gratings.

10. The method of claim 9, wherein the plurality of optical gratings and the receiver optics are arranged in the same plane.

11. The method of claim 9, wherein each of the plurality of optical gratings corresponds to one optical emission site of the array of optical emission sites.

12. The method of claim 9, wherein a plurality of grating couplers couple incident light from each grating of the plurality of optical gratings into the waveguide.

13. The method of claim 12, wherein the plurality of grating couplers are made from silicon nitride, wherein the optical gratings are made from silicon or silicon nitride, and wherein the waveguide is made from silicon or silicon nitride.

14. The method of claim 1, wherein the mask comprises a layer having a plurality of openings, each opening being in the light path leading to a respective one of the optical detection sites.

15. The method of claim 14, wherein the layer is made from a material selected from the group consisting of aluminum, copper, gold, platinum, chromium, titanium, silicon, carbon, graphite, or combinations thereof.

16. The method of claim 1, wherein a shape of at least one of the apertures corresponds to a calculated or measured aberrated shape of a light spot received in a focal plane of the respective optical detection site.

17. The method of claim 1, wherein a shape of at least one of the apertures is different from a shape of another one of the apertures.

18. The method of claim 1, wherein a shape of at least one of the apertures is selected to mitigate variations in manufacturing of the respective optical detection site or a thermal shift of the respective optical detection site.

19. The method of claim 1, further comprising, by a controller, selectively activating or deactivating each optical detection site of the array of optical detection sites.

20. The method of claim 19, wherein a size of each optical detection site is smaller than a size of each light spot projected onto the receiver optics.

21. The method of claim 19, further comprising, by the controller, selectively activating or deactivating each optical detection site to correspond to a calculated or measured aberrated shape of a light spot received in a focal plane of the array of optical detection sites.

22. The method of claim 19, further comprising, by the controller, selectively activating or deactivating each optical emission site of the array of optical emission sites.

23. The method of claim 22, wherein an activation state of at least one emission site of the array of optical emission sites determines an activation state of an associated at least one optical detection site of the array of optical detection sites.

24. The method of claim 1, wherein the optical detection sites are single-photon avalanche diode (SPAD) detectors.

25. The method of claim 1, wherein the optical detection sites are silicon photomultiplier (SiPM) detectors.

26. The method of claim 1, wherein the birefringent prism shifts a beam of light traveling through the birefringent prism by half a degree or less.

\* \* \* \* \*